United States Patent Office 3,386,975
Patented June 4, 1968

3,386,975
TERPOLYMERS OF A POLYCYCLIC DIOLEFIN AND TWO MONO-OLEFINS
Walter Marconi, Sebastiano Cesca, and Giorgio Della Fortuna, Milan, Italy, assignors to SNAM S.p.A., Milan, Italy, a corporation of Italy
No Drawing. Filed May 22, 1964, Ser. No. 369,618
Claims priority, application Italy, May 24, 1963, 10,727/63
13 Claims. (Cl. 260—80.7)

It is the object of the present invention to provide a process for the preparation of linear, amorphous terpolymers from mono-olefines and a polycyclic diolefine, which can be vulcanized.

In a preceding Italian patent application of the applicants (Italian Patent No. 650,399 filed May 2, 1961, granted December 12, 1962) new catalyst systems have been described for the homo- and co-polymerization of the alphaolefines, deriving from the union of a compound of a transition metal of the Groups IVa, Va, VIa and VIII of the Periodic System according to Mendeleeff, with a simple or substituted, not metal-organic aluminum hydride, soluble in aromatic hydrocarbons.

In a successive patent application of addition, a process which utilizes the above said catalyst system to obtain rubbery, linear, amorphous copolymers of alpha-olefines, in particular copolymers of ethylene and propylene, has been particularly claimed.

The soluble aluminum hydrides claimed as catalysts in the above indicated Italian patent applications, show the general formula AlHXY, wherein X and Y can be a hydrogen atom, a halogen atom or a secondary aminic radical

with $R_1$ and $R_2$ equal or different, and equal to alkyl, aryl, alkylaryl or cycloalkyl; $R_1$ and $R_2$ may also be part of a nitrogen containing heterocyclic nucleus. Said hydrides may be in cases complexed with a Lewis base.

They can generally be prepared easily and some of them are described in the literature (E. Wiberg, Zeitschr. f. Naturforschung, 6b–452 (1951) and J. K. Ruff, J. Am. Chem. Soc., 85–535 and 2835 (1961)).

As transition metal compounds have been used: a halide or oxy-halide, or an alcoholate, or a titanium- or vanadium-acetylacetonate, such as $VCl_3$, $TiCl_3$, $VOCl_3$, $TiCl_4$, $VO(OC_2H_5)_3$, $Ti(OC_4H_9)_4$ and so on.

The linear, amorphous copolymers ethylene-propylene produced with these catalysts show very good elastomeric properties and an exceptional stability in regard to the chemical reagents and to the agents which cause oxydative degradation such as the atmospheric oxygen, the ozone, the ultraviolet radiations and so on.

However since they are rubbers which do not contain olefinic unsaturations, they have to be vulcanized with particular expedients consisting in the previous introduction of reactive groups in the polymeric chains and in the reaction with radical generating agents, such as the organic peroxides capable of forming cross-linkages among different chains.

It is possible to obviate to such an inconvenience by introducing in the copolymer saturated chain, unsaturated groups which remain available for a successive vulcanization with sulphur, according to the most simple techniques generally used for the unsaturated rubbers.

It has been tried to solve the problem in the above indicated sense by producing terpolymers on the base of ethylene, propylene and cyclic diolefines, by employing catalyst systems constituted of salts of transition elements and metal-organic aluminum derivatives which contain one or more linkages aluminum-carbon.

It is on the other hand known that if one attempts to produce the same terpolymers ethylene-alpha-olefine-diolefine with catalyst systems comprising, instead of the metal-organic aluminum compounds, inorganic hydrides of the I, II and III group of the Periodic System according to Mendeleeff, which are insoluble in hydrocarbons, products are obtained having bad dynamic and mechanical properties.

Applicants have now susprisingly found that it is possible to produce elastomeric, amorphous, unsaturated polymers endowed with very good mechanical and dynamic properties from two mono-olefines (preferably ethylene and an alpha-olefine) and a polycyclic diolefine, by employing catalyst systems comprising:

(a) A compound of the transition metal of the IVa, Va group of the periodic system;

(b) An aluminum hydride, soluble in aromatic hydrocarbons, simple or substituted and/or complexed with an electron releasing substance, comprised in the general formula

where X and Y are equal or different and may be a hydrogen atom, a halogen atom or a secondary aminic radical.

Such a result could not be foreseen since, for what above said, catalyst systems comprising insoluble inorganic hydrides, which are suitable for the production of plastic homopolymers of alpha-olefines, cannot give binary copolymers and amorphous terpolymers on the base of ethylene, alpha-olefines and diolefines which are endowed with good mechanical and dynamic properties.

It has further to be noted than only some of the catalyst systems claimed by applicant in the Italian Patent No. 650,399 for the homo-polymerization and copolymerization of alpha-olefines have given good results for the preparation of terpolymers with the process according to the invention, while systems have been excluded comprising compounds of the metals of the groups VIa and VIII.

The use of the catalyst systems as above defined, in the process for the preparation of terpolymers according to the invention, presents with respect to the catalyst systems comprising aluminum metal-organic compounds, many advantages which may be summarized as follows:

(a) The employed aluminum hydrides are endowed with reducing power varying in a wide range and allow then the realization of catalyst systems with different activity depending on the reaction conditions (temperature, solvent, presence of the monomers, interaction time and so on) with the transition metal salt. Since in the production of terpolymers from ethylene, alpha-olefines and diolefines, each diolefine requires generally a suitable election of the catalyst and of the polymerization conditions, the wide range of so available catalyst systems having different activity, allows the production of elastomeric terpolymers of different composition and then of different characteristics, always with very good polymerization rate and good distribution of composition and of molecular weights;

(b) The alane-derivatives used in the process according to the present invention have a cost very lower than aluminum-alkyls;

(c) They are not inflammable when in contact with the air;

(d) They possess moderate reactivity toward active hydrogen atoms containing compounds, such as water, alcohol and so on.

They are liquid or solid and in any case are soluble in aromatic organic solvents simple or halogenated.

As compound of the transition metal it is used preferably $VCl_4$, $VOCl_3$ or $TiCl_4$.

The preferably used aluminum hydrides are:

$AlHCl_2.O(C_2H_5)_2$, $AlHCl_2.N(C_2H_5)_3$, $AlH_3.N(CH_3)_3$ $H_2Al-N(CH_3)_2$, $AlH_2Br.N(CH_3)_3$, $HBrAl-N(C_6H_5)_2$ $H_2Al-N(CH_2)_5$, $HBrAl-N(CH_3)_2$

As polycyclic diolefines are particularly suitable, for the purposes of the present invention, those polyannular hydrocarbons which have at least 7 carbon atoms and which do not contain the two double bonds on the same ring of the molecule.

Examples of such compounds are: 2-methylene-norbornene, 2-alkyl-norbornadiene, dicyclopentadiene, alkylen-norbornenes.

Since, in order to confer to the terpolymer the desired technological properties and, above all, in order to render it vulcanizable, the introduction of a limited number of unsaturations for every polymer chain is sufficient, we have prepared terpolymers containing from 0.5 to 20% by weight of polycyclic diolefine and preferably from 0.8 to 10%.

As mono-olefinic monomers there are preferably used ethylene, propylene for the wide availability, the low cost and their high reactivity, but the invention is in no way limited to these monomers, since one can equally well use mixtures of ethylene and butene-1, propylene and butene-1, propylene and 3-methyl-butene-1, and so on.

In the case that the employed monomers are ethylene, propylene and dicyclopentadiene, it is preferred to suitably regulate the ratio among the reacted monomers, so as to obtain in the final terpolymer ethylene amounts varying from 30 to 70% by weight and propylene amounts varying from 30 to 70% by weight.

The terpolymers obtained by us in this range of compositions, are amorphous as shown by the analysis under X-rays.

This shows clearly that we have to do with terpolymers and in no way with mechanical admixtures of homopolymers or block-copolymers.

Also the shifting of the angle $2\theta$ ($\theta$ is the angle of Bragg) demonstrates the obtainment of true amorphous terpolymers. The obtained terpolymers have undergone successive extractions with solvents having increasing boiling temperatures; the order is as follows: ethyl ether, n-hexane, n-heptane.

Either the various extracted fractions or the extraction residues, revealed practically no presence of crystallinity at the X-rays and satisfactory homogeneity of composition.

The measurement of unsaturation has been carried out with chemical methods, by addition of iodine mono-chloride according to: T. S. Lee, I. M. Kolthoff, M. A. Mairs, J. Polymer Sci. 3, 66 (1948), T. S. Lee et al., Anal. Chem. 22, 995 (1950).

The molecular weights of the obtained polymers have been determined by measuring the intrinsic viscosities in tetralin at 135° C. of 0.1% by weight polymer solutions.

The intrinsic viscosity values are depending on the operative modalities in the above conditions and can vary from 1 to 6 and, more frequently from 1.5 to 3.

The vulcanization tests have been performed on the raw polymers obtained by coagulating the reaction solutions, with recipes analogous to those used for unsaturated rubbery materials. The transition metal compound and the derivative of the aluminum hydride, whose interaction gives rise to a suspension which is the true active component of the catalyst, can be made to react between them in the absence or in the presence of the monomer to be polymerized, and can also be made to react in the polymerization vessel or previously a part.

Such a preparation of the catalyst can be realized at temperatures higher or lower than room temperature, generally at temperatures comprised between —30° and +40° C. in the same polymerization solvents, under inert gas and atmospheric pressure.

The activity of the prepared catalyst depends in a remarkable extent on the interaction time among the components of the catalyst system in the case the employed compound of the transition metal be soluble in the reaction solvent.

The molar ratio with which the aluminum hydride and the transition metal compound are combined can vary in a wide range depending on the number of aluminum-hydrogen bonds present in the molecule of the hydride and of the eventual complexing agents present.

It is generally comprised between 0.25 and 8, preferably between 0.5 and 5.

The amount of the employed transition metal compound is generally comprised between 2 and 50 and preferably between 4 and 20 millimoles per liter of solvent.

As polymerization solvents are used aromatic, aliphatic, cycloaliphatic hydrocarbons as well as saturated or unsaturated chlorinated hydrocarbons, such as for example toluene, n-heptane, cyclohexane, ethylene tetrachloride and carbon tetrachloride.

It is also possible to operate in the absence of solvents, by using an excess of the less reactive olefine, it is for example possible to realize the terpolymerization ethylene-propylene-dicyclopentadiene in liquid propylene.

In general the polymerizations are carried out in a thermostated reactor which can resist moderate pressures and wherein the solvent is introduced initially while the monomers are fed up to reach the concentration pertaining to the saturation equilibrium.

The catalyst may be introduced already formed or may be formed "in situ" by interaction of the two components in the presence of the monomers.

The reaction is then carried out at temperatures comprised between —30° and +40° C., preferably —10° and +30° C. The pressure can vary from 1 to 10 atm. preferably from 1 to 5. The reaction, due to the high conversion rate, is generally conducted for short times (5–60 minutes).

At the reaction end, the polymer, which is prevailingly soluble in the used solvents, is recovered by coagulation and drying according to the usual methods.

The following illustrative examples will better explain the purposes and the results of the present invention without being a limitation for it.

EXAMPLE 1

In a glass reactor, having a capacity of 800 cc.; 400 cc. of n-heptane, precedently washed according to the usual techniques and distilled on metallic sodium under inert atmosphere, are introduced under nitrogen.

The reactor, which is provided with an efficient stirrer, with funnel and thermometric sheath, is placed in a thermostatic bath at 25° C. and is kept at this temperature over all the polymerization period.

It is then fed a gaseous mixture of ethylene and propylene, having a molar ratio propylene/ethylene=2.83, with a high flow (about 120 N l./h.) over a period of about 30 minutes.

In order to facilitate the saturation equilibrium to be reached the solvent is efficiently stirred and the gas mixture is introduced at the reactor bottom, which is suitably shaped so as to realize a speedy distribution of the gases in the liquid; further the gases are diffused in the solvent through a synterized glass disk which facilitates a fine dispersion of the micro-bubbles.

25 mmoles of $HCl_2Al.O(C_2H_5)_2$ are then introduced for liter of solvent while an efficient stirring of the n-heptane is maintained by means of a gaseous stream of ethylene and propylene. Immediately after 13.8 mmoles/l. of dicyclopentadiene are introduced, which have been previously distilled under reduced pressure and then passed slowly through a column containing activated alumina at 250° C. Finally 10 mmoles/l. of VCl$_4$ are added to the solution under strong stirring.

Over all the polymerization time, a stream of ethylene and propylene having the starting composition is fed.

After 30 minutes the reaction is stopped by adding some cc. of ethylic alcohol. The solution is coagulated by pouring it in excess ethylic alcohol containing 50% acetone and 5% HCl.

5.5 g. of rubbery polymer of amber color are obtained. This polymer results under X-ray examination completely amorphous; intrinsic viscosity measured in tetralin at 135° [$\eta$]=1.50 dl./g.

The I.R. analysis and the iodine number determination furnish the following percent composition by weight of the terpolymer.

|  | Percent |
|---|---|
| Ethylene | 43.0 |
| Propylene | 55.7 |
| Dicyclopentadiene | 1.3 |

By subjecting the produced terpolymer to extraction with solvents, the results summarized in the following table are obtained:

|  | Percent, weight | Percent, ethylene | Percent, propylene | Percent, dicyclopentadiene | Percent, crystallinity |
|---|---|---|---|---|---|
| Ether extract | 63.3 | 48 | 52 | (¹) | 0 |
| n-Hexane extract | 12.6 | 50 | 50 | (¹) | 0 |
| n-Heptane extract | 12.5 | 52 | 48 | (¹) | (²) |
| Residue | 11.6 | (¹) | (¹) | (¹) | (¹) |

¹ Not determined.
² Traces.

A portion of the produced elastomer has been subjected to a vulcanization test according to the following recipe:

| Terpolymer | parts | 100 |
|---|---|---|
| Stearic acid | do | 0.5 |
| ZnO | do | 5 |
| Sulphur | do | 2 |
| 2-mercaptobenzothiazole | do | 1 |
| Tetramethylthiuram disulphid | do | 2 |
| Vulcanization temperature, ° C. | | 175 |
| Vulcanization time, minutes | | 20 |

On the so-produced sample the following mechanical characteristics have been determined with a traction rate of 180 mm./min.:

Modulus at 300% elongation
          kg./cm.$^2$__ 16.1 (ASTM-D412-51T)
Ultimate load ____kg./cm.$^2$__ 45.4 (ASTM-D412-51T)
Elongation at break
          percent__ 730 (ASTM-D412-51T)
Micro-rebound elasticity
          do____    59 (DIN 53512)

EXAMPLE 2

It is operated quite in analogy to what is described in the preceding example, with the only difference that in the feeding of gaseous mixture propylene and ethylene there is a molar ratio of 1.82.

After 30 minutes of polymerization 7.8 g. of polymer are obtained which under X-ray examination appears to be completely amorphous.

The analysis by means of I.R. spectrography and of iodine member measurement furnishes the following composition:

|  | Percent by weight |
|---|---|
| Ethylene | 50 |
| Propylene | 48.4 |
| Dicyclopentadiene | 1.6 |

A portion of the produced elastomer has been subjected to vulcanization according to the recipe of Example 1.

The measured characteristics furnished the following values:

| Modulus at 300% elongation | kg./cm.$^2$ | 32.0 |
|---|---|---|
| Ultimate load | kg./cm.$^2$ | 40.8 |
| Elongation at break | percent | 460 |
| Micro rebound elasticity | do | 60 |

EXAMPLE 3

Example 1 is repeated by employing a mixture of propylene/ethylene having a molar ratio of 4.0. After 30 minutes 8.5 g. of completely amorphous polymer under X-ray examination and which shows an intrinsic viscosity [$\eta$]=2.07 dl./g., are obtained.

The analysis by means of I.R. spectrography gives the following composition:

|  | Percent by weight |
|---|---|
| Ethylene | 38.0 |
| Propylene | 58.0 |
| Dicyclopentadiene | 4.0 |

After vulcanization according to the recipe of Example 1, the following measures have been obtained:

| Modulus at 300% elongation | kg./cm.$^2$ | 23.0 |
|---|---|---|
| Ultimate load | kg./cm.$^2$ | 55.0 |
| Elongation at break | percent | 510 |
| Micro rebound elasticity | do | 61.5 |

EXAMPLE 4

Example 1 is repeated, with the only difference that it is operated at the temperature of −6° C. After 30 minutes 19.4 g. of completely amorphous under X-ray examination elastomer are obtained, which present an intrinsic viscosity [$\eta$]=2.05 dl./g.

The analysis gives the following compositions:

|  | Percent by weight |
|---|---|
| Ethylene | 30.0 |
| Propylene | 67.7 |
| Dicyclopentadiene | 2.3 |

The characteristics of the cured product are as follows:

| Modulus at 300% elongation | kg./cm.$^2$ | 16 |
|---|---|---|
| Ultimate load | kg./cm.$^2$ | 50 |
| Elongation at break | percent | 640 |
| Micro rebound elasticity | do | 68 |

EXAMPLE 5

A terpolymer is prepared according to Example 1 with the only difference that 27.8 mmoles/l. of dicyclopentadiene are used.

After 30 minutes 4.0 of an amorphous elastomer are obtained having intrinsic viscosity [$\eta$]=2.6 dl./g. and a composition as follows:

|  | Percent by weight |
|---|---|
| Ethylene | 38 |
| Propylene | 58 |
| Dicyclopentadiene | 4.0 |

After vulcanization the vulcanized elastomer shows the following set of characteristics:

| | |
|---|---|
| Modulus at 300% elongation _____kg./cm.$^2$__ | 15.3 |
| Ultimate load _____kg./cm.$^2$__ | 46.3 |
| Elongation at break _____percent__ | 280 |
| Micro-rebound elasticity _____do____ | 60 |
| Set after breaking _____do____ | 17 |

EXAMPLE 6

The preceding example is repeated by introducing 35.6 mmoles/l. of dicyclopentadiene at the starting of the test.

After 30 minutes 4.0 g. of an amorphous elastomer are X-ray examination polymer are obtained; $[\eta]=2.34$ dl./g.

The analysis furnishes the following results:

| | Percent by weight |
|---|---|
| Ethylene | 50.0 |
| Propylene | 46.4 |
| Dicyclopentadiene | 3.6 |

After vulcanization according to the recipe of Example 1, of a part of the produced terpolymer, the following values have been obtained:

| | |
|---|---|
| Modulus at 300% elongation _____kg./cm.$^2$__ | 40.0 |
| Ultimate load _____kg./cm.$^2$__ | 86.8 |
| Elongation at break _____percent__ | 530 |
| Micro-rebound elasticity _____do____ | 60 |

EXAMPLE 7

The preceding example is repeated by employing a gaseous mixture propylene/ethylene having a molar ratio 4.0.

After 30 minutes 7.1 g. of essentially amorphous polymer under X-ray examination are obtained; $[\eta]=3.05$ dl./g.

The terpolymer analysis furnishes the following results:

| | Percent by weight |
|---|---|
| Ethylene | 42.7 |
| Propylene | 54.0 |
| Dicyclopentadiene | 3.3 |

After vulcanization of a part of the produced terpolymer, according to the recipe of Example 1, the following values have been obtained:

| | |
|---|---|
| Modulus at 300% elongation _____kg./cm.$^2$__ | 63 |
| Ultimate load _____kg./cm.$^2$__ | 85 |
| Elongation at break _____percent__ | 420 |
| Micro-rebound elasticity _____do____ | 61 |

EXAMPLE 8

It is operated according to that described in Example 1, by employing 10 mmoles/l. of HBrAl—N(CH$_3$)$_2$, 5 mmoles/l. of VCl$_4$, 36.5 mmoles/l. of dicyclopentadiene and a gaseous stream of propylene/ethylene having a molar ratio of 1.5.

After 30 minutes 11.6 g. of polymer are obtained which are substantially amorphous under X-ray examination and present an intrinsic viscosity in tetralin at 135° C. $[\eta]=0.90$ dl./g.

The I.R. analysis furnishes the following compositions:

| | Percent by weight |
|---|---|
| Ethylene | 46.0 |
| Propylene | 52.0 |
| Dicyclopentadiene | 2.0 |

The mechanical-dynamic evaluations give, after vulcanization, the following results:

| | |
|---|---|
| Modulus at 300% elongation _____kg./cm.$^2$__ | 43 |
| Ultimate load _____kg./cm.$^2$__ | 93 |
| Elongation at break _____percent__ | 620 |
| Micro-rebound elasticity _____do____ | 71 |

EXAMPLE 9

Example 8 is repeated by employing a mixture propylene/ethylene having a molar ratio 2.83.

After 30 minutes 9.5 g. of completely amorphous under X-ray examination polymer are obtained; the composition is as follows:

| | Percent by weight |
|---|---|
| Ethylene | 33.4 |
| Propylene | 65.0 |
| Dicyclopentadiene | 1.6 |

The intrinsic viscosity is determined as $[\eta]=3.89$ dl./g.

After vulcanization according to the recipe of Example 1, the following results are obtained:

| | |
|---|---|
| Modulus at 300% elongation _____kg./cm.$^2$__ | 31 |
| Ultimate load _____kg./cm.$^2$__ | 80 |
| Elongation at break _____percent__ | 720 |
| Micro-rebound elasticity _____do____ | 68 |

EXAMPLE 10

It is operated completely in accordance with the preceding example with the only difference that 18.3 mmoles/l. dicyclopentadiene are used.

After 30 minutes 10.7 g. of completely amorphous under X-ray examination polymer were obtained, which presents the following composition:

| | Percent by weight |
|---|---|
| Ethylene | 28.7 |
| Propylene | 70.0 |
| Dicyclopentadiene | 1.3 |

The measured intrinsic viscosity is $[\eta]=2.22$ dl./g.

After vulcanization according to the recipe of Example 1, the following results are obtained:

| | |
|---|---|
| Modulus at 300% elongation _____kg./cm.$^2$__ | 28 |
| Ultimate load _____kg./cm.$^2$__ | 65 |
| Elongation at break _____percent__ | 740 |
| Micro-rebound elasticity _____do____ | 69 |

EXAMPLE 11

It is operated according to Example 9 with the only difference that 54.8 mmoles/l. of dicyclopentadiene are used.

After 30 minutes 8.7 g. of an elastomer are obtained, which is essentially amorphous under X-ray examination.

By means of I.R. spectrography and determination of the iodine number the following composition is calculated:

| | Percent by weight |
|---|---|
| Ethylene | 36.1 |
| Propylene | 62.0 |
| Dicyclopentadiene | 1.9 |

After vulcanization, according to the recipe of Example 1, the following results are obtained:

| | |
|---|---|
| Modulus at 300% elongation _____kg./cm.$^2$__ | 33 |
| Ultimate load _____kg./cm.$^2$__ | 75 |
| Elongation at break _____percent__ | 630 |
| Micro-rebound elasticity _____do____ | 70 |

EXAMPLE 12

It is operated as described in Example 1 by employing 4 mmoles/l. of H$_2$AlN(CH$_3$)$_2$, 5 mmoles/l. of VCl$_4$, 36.5 mmoles/l. of dicyclopentadiene and a propylene/ ethylene mixture having a molar ratio 1.89.

After 30 minutes 10.2 g. of an elastomer are obtained, which is essentially amorphous under X-ray analysis.

By means of I.R. spectrography and determination of the iodine number, the following composition is calculated:

| | Percent by weight |
|---|---|
| Ethylene | 42.4 |
| Propylene | 56.0 |
| Dicyclopentadiene | 1.6 |

After vulcanization the following results are obtained:

| | |
|---|---|
| Modulus at 300% elongation _____kg./cm.$^2$__ | 45 |
| Ultimate load _____kg./cm.$^2$__ | 90 |
| Elongation at break _____percent__ | 560 |
| Micro-rebound elasticity _____do____ | 64 |

EXAMPLE 13

The preceding example is repeated with the only difference that a mixture propylene/ethylene with a molar ratio 2.83 is employed. After 30 minutes 9.1 g. of a completely amorphous elastomer (X-ray analysis) and which reveals an intrinsic viscosity $[\eta]=3.95$ dl./g. are obtained.

The following composition is calculated by means of I.R. spectrography and iodine number measurement:

|  | Percent by weight |
|---|---|
| Ethylene | 5.9 |
| Propylene | 62.0 |
| Dicyclopentadiene | 2.1 |

After vulcanization according to the recipe of Example 1, the following values are obtained:

| | |
|---|---|
| Modulus at 300% elongation _____kg./cm.$^2$__ | 38 |
| Ultimate load _____kg./cm.$^2$__ | 90 |
| Elongation at break _____percent__ | 640 |
| Micro-rebound elasticity _____do____ | 65 |

EXAMPLE 14

Example 12 is repeated with the only difference that 18.3 mmoles/l. of dicyclopentadiene are used. After 25 minutes 10.1 g. of completely amorphous elastomer under X-ray examination are obtained; intrinsic viscosity $[\eta]=4.44$ dl./g.

The following composition is calculated by means of I.R. spectrography and iodine number measurement:

|  | Percent by weight |
|---|---|
| Ethylene | 41.2 |
| Propylene | 58.0 |
| Dicyclopentadiene | 0.8 |

After vulcanization according to the recipe of Example 1 the following results are obtained:

| | |
|---|---|
| Modulus at 300% elongation _____kg./cm.$^2$__ | 33 |
| Ultimate load _____kg./cm.$^2$__ | 74 |
| Elongation at break _____percent__ | 630 |
| Micro-rebound elasticity _____do____ | 68 |

EXAMPLE 15

Example 12 is repeated with the only difference that 54.8 mmoles/l. of dicyclopentadiene are used.

After 30 minutes 9.4 g. of essentially amorphous under X-ray examination elastomer are obtained; intrinsic viscosity $[\eta]=4.88$ dl./g.

The composition resulting at the analysis is the following:

|  | Percent by weight |
|---|---|
| Ethylene | 41.7 |
| Propylene | 46.0 |
| Dicyclopentadiene | 2.3 |

After vulcanization according to the recipe of Example 1, the following results are obtained:

| | |
|---|---|
| Modulus at 300% elongation _____kg./cm.$^2$__ | 46 |
| Ultimate load _____kg./cm.$^2$__ | 97 |
| Elongation at break _____percent__ | 520 |
| Micro-rebound elasticity _____do____ | 66 |

EXAMPLE 16

It is operated as described in Example 1 by employing 7.0 mmoles/l. of $H_3AlN(CH_3)_3$, 10 mmoles/l. of $VCl_4$, 36.5 mmoles/l. of dicyclopentadiene and a gaseous mixture propylene/ethylene having a molar ratio 2.83.

After 30 minutes 9.6 g. of a completely amorphous under X-ray examination elastomer are obtained; intrinsic viscosity $[\eta]=3.44$ dl./g.

The composition resulting from the analysis is as follows:

|  | Percent by weight |
|---|---|
| Ethylene | 39.5 |
| Propylene | 58.0 |
| Dicyclopentadiene | 2.5 |

After vulcanization according to the recipe of Example 1, the following results are obtained:

| | |
|---|---|
| Modulus at 300% elongation _____kg./cm.$^2$__ | 29 |
| Ultimate load _____kg./cm.$^2$__ | 61 |
| Elongation at break _____percent__ | 640 |
| Micro-rebound elasticity _____do____ | 64 |

EXAMPLE 17

It is operated with the same apparatus and the same modalities as described in Example 1.

400 cc. of toluene, 20.0 mmoles/l. of $TiCl_4$, 50.0 mmoles/l. of $HCl_2AlO(C_2H_5)_2$, 36.5 mmoles/l. of dicyclopentadiene, a gaseous mixture propylene/ethylene having a molar ratio 4.0 and a temperature of 0° C. are used.

After 30 minutes polymerization 7.0 g. of elastomer are obtained which is completely amorphous under X-ray examination and shows an intrinsic viscosity $[\eta]=0.94$ dl./g.

The analysis of the produced polymer is as follows:

|  | Percent by weight |
|---|---|
| Ethylene | 51.4 |
| Propylene | 44.0 |
| Dicyclopentadiene | 4.6 |

After vulcanization according to the recipe of Example 1, of a part of the produced elastomer, the following values are obtained:

| | |
|---|---|
| Modulus at 300% elongation _____kg./cm.$^2$__ | 26 |
| Ultimate load _____kg./cm.$^2$__ | 37 |
| Elongation at break _____percent__ | 480 |
| Micro-rebound elasticity _____do____ | 51 |

EXAMPLE 18

It is operated as described in Example 1 by employing 13.9 mmoles/l. of dicyclopentadiene and a gaseous mixture propylene/ethylene having a molar ratio of 2.83.

The polymerization temperature is kept at 0° C. After 30 minutes 18.7 g. of an elastomer are obtained which is completely amorphous under X-ray examination and has an intrinsic viscosity $[\eta]=2.2$ dl./g.

The polymer composition results as follows:

|  | Percent by weight |
|---|---|
| Ethylene | 61.3 |
| Propylene | 37.4 |
| Dicyclopentadiene | 1.3 |

After vulcanization according to the recipe of Example 1, the vulcanized elastomer shows the following characteristics:

| | |
|---|---|
| Modulus at 300% elongation _____kg./cm.$^2$__ | 16.8 |
| Ultimate load _____kg./cm.$^2$__ | 25.7 |
| Elongation at break _____percent__ | 450 |
| Micro-rebound elasticity _____do____ | 61 |
| Set after breaking _____do____ | 20 |

EXAMPLE 19

By operating according to Example 1, the reactor is kept at −10° C. and a monomers mixture is fed having a molar ratio propylene/ethylene=1.50.

After 30 minutes 25.0 g. of a completely amorphous elastomer are obtained having intrinsic viscosity $[\eta]=2.71$ dl./g. and the following composition:

|  | Percent by weight |
|---|---|
| Ethylene | 48.9 |
| Propylene | 50 |
| Dicyclopentadiene | 1.1 |

An amount of the obtained polymer is dissolved in toluene at 50° C. and fractionated by means of added increasing amounts of a non-solvent (methyl-alcohol). In every obtained fraction it has been determined the percentage of dicyclopentadiene contained in the macromolecules.

The following results are obtained.

Fractions: | Percent dicyclopentadiene
--- | ---
1 | 1.0
2 | 1.1
3 | 1.1
4 | 0.9
5 | 0.9

As it appears clearly from the above data the dicyclopentadiene is uniformly distributed in the terpolymer macromolecules.

Another amount of elastomer has been vulcanized according to the recipe of Example 1 and the following measurements performed on it:

Modulus at 300% elongation _____ kg./cm.$^2$__ 18.6
Ultimate load _____ kg./cm.$^2$__ 34.8
Elongation at break _____ percent__ 590
Micro-rebound elasticity _____ do____ 66
Set after breaking _____ do____ 27

EXAMPLE 20

By operating according to Example 1, the reactor is cooled at −10° C. and the solvent saturated with a mixture of monomers having a molar ratio propylene/ethylene=1.92. 13.9 mmoles/l. of dicyclopentadiene are introduced and then 5 mmoles/l. of VCl$_4$ and 4 mmoles/l. of H$_2$Al N(CH$_3$)$_2$.

After 20 minutes 13.9 g. of a completely amorphous elastomer are obtained, showing the following composition:

| | Percent by weight |
| --- | --- |
| Ethylene | 36 |
| Propylene | 62 |
| Dicyclopentadiene | 1.7 |

The produced elastomer is fractionated by precipitation with methanol from a toluene solution.

The percentage of dicyclopentadiene in the various fractions is as follows.

Fractions: | Percent dicyclopentadiene
--- | ---
1 | 1.5
2 | 1.4
3 | 1.7
4 | 1.6

Also in this case a quite regular distribution of dicyclopentadiene in the various terpolymer fractions is ascertained.

EXAMPLE 21

Example 15 is repeated with the only difference that 54.8 mmoles/l. of dicyclopentadiene are used.

After 30 minutes 6.9 g. of completely amorphous elastomer under X-ray examination are obtained; intrinsic viscosity [η]=1.22 dl./g. The analysis gives the following composition:

| | Percent by weight |
| --- | --- |
| Ethylene | 53.8 |
| Propylene | 40.0 |
| Dicyclopentadiene | 6.2 |

After vulcanization according to the recipe of Example 1 of a part of the produced elastomer, the following values are obtained:

Modulus at 300% elongation _____ kg./cm.$^2$__ 27
Ultimate load _____ kg./cm.$^2$__ 40
Elongation at break _____ percent__ 480
Micro-rebound elasticity _____ do____ 50

EXAMPLE 22

Example 21 is repeated with the only difference that a mixture propylene/ethylene having a molar ratio 3.0 is used.

After 30 minutes of polymerization 9.0 g. of essentially amorphous under X-ray examination elastomer are obtained; it shows an intrinsic viscosity [η]=1.18 dl./g.

The analysis indicates the following composition of the terpolymer:

| | Percent by weight |
| --- | --- |
| Ethylene | 57.7 |
| Propylene | 35.0 |
| Dicyclopentadiene | 7.3 |

The extraction with solvents gives the results hereinafter summarized:

| | Percent, weight | Percent, ethylene | Percent, propylene | Percent, dicyclopentadiene | Percent, crystallinity |
| --- | --- | --- | --- | --- | --- |
| Ether extract | 64.3 | 54 | 46 | (¹) | 0 |
| n-Hexane extract | 18.8 | 57 | 43 | (¹) | 0 |
| n-Heptane extract | 8.6 | 62 | 38 | (¹) | (²) |
| Residue | 9.2 | (¹) | (¹) | (¹) | (¹) |

¹ Not determined.
² Traces.

The characteristics of the vulcanized product are the following ones:

Modulus at 300% elongation _____ kg./cm.$^2$__ 26.9
Ultimate load _____ kg./cm.$^2$__ 65.0
Elongation at break _____ percent__ 530
Micro-rebound elasticity _____ do____ 56

EXAMPLE 23

The preceding example is repeated with the only difference that 36.5 mmoles/l. of dicyclopentadiene are used.

After 30 minutes 9.6 g. of essentially amorphous under X-ray examination elastomer are obtained; it shows an intrinsic viscosity [η]=0.88 dl./g.

The terpolymer analysis shows the following composition:

| | Percent by weight |
| --- | --- |
| Ethylene | 62.1 |
| Propylene | 33.0 |
| Dicyclopentadiene | 4.9 |

The characteristics of the vulcanized product are as follows:

Modulus at 300% elongation _____ kg./cm.$^2$__ 29
Ultimate load _____ kg./cm.$^2$__ 56
Elongation at break _____ percent__ 530
Micro-rebound elasticity _____ do____ 56

EXAMPLE 24

It is operated according to the preceding example with the only difference that 71.0 mmoles/l. of dicyclopentadiene are used. After 30 minutes 6.9 g. of essentially amorphous under X-ray examination elastomer are obtained; it presents an intrinsic viscosity [η]=0.95 dl./g.

The polymer analysis shows the following composition:

| | Percent by weight |
| --- | --- |
| Ethylene | 65.0 |
| Propylene | 29.3 |
| Dicyclopentadiene | 5.7 |

The characteristics of the vulcanized product are as follows:

| | |
|---|---|
| Modulus at 300% elongation _____kg./cm.$^2$__ | 33.8 |
| Ultimate load _____kg./cm.$^2$__ | 42.3 |
| Elongation at break _____percent__ | 320 |
| Micro-rebound elasticity _____do____ | 54 |

EXAMPLE 25

The Example 22 is repeated with the only difference that a stream propylene/ethylene having a molar ratio 2.0 is employed. After 30 minutes 10.9 g. of an elastomer are obtained, which is essentially amorphous under X-ray examination and shows an intrinsic viscosity $[\eta]=1.24$ dl./g.

The terpolymer analysis accounts for the following composition:

| | Percent by weight |
|---|---|
| Ethylene _____ | 71.0 |
| Propylene _____ | 24.4 |
| Dicyclopentadiene _____ | 4.6 |

The extraction with solvents furnishes the following results:

| | Percent, weight | Percent, ethylene | Percent, propylene | Percent, dicyclopentadiene | Percent, crystallinity |
|---|---|---|---|---|---|
| Ether extract_____ | 50.1 | 69 | 31 | (¹) | 0 |
| n-Hexane extract_____ | 26.5 | 71 | 29 | (¹) | 0 |
| n-Heptane extract_____ | 16.6 | 74 | 26 | (¹) | (²) |
| Residue_____ | 6.7 | (¹) | (¹) | (¹) | (¹) |

¹ Not determined.
² Traces.

EXAMPLE 26

It is operated with the same apparatus and according to the same modalities described in Example 1.

400 cc. of toluene, 7.5 mmoles/l. of TiCl$_4$, 6.75 mmoles/l. of H$_2$Al-N(CH$_3$)$_2$, 18.3 mmoles/l. of dicyclopentadiene, a gaseous mixture propylene/ethylene having a molar ratio 4.0 and a temperature of 0° C., are used.

After 30 minutes polymerization 8.0 g. of completely amorphous under X-ray examination elastomer are obtained; it presents an intrinsic viscosity $[\eta]=1.84$ dl./g.

The analysis of the produced polymer is as follows:

| | Percent by weight |
|---|---|
| Ethylene _____ | 63.0 |
| Propylene _____ | 34.4 |
| Dicyclopentadiene _____ | 2.6 |

The characteristics of the vulcanized product are the following ones:

| | |
|---|---|
| Modulus at 300% elongation _____kg./cm.$^2$__ | 32 |
| Ultimate load _____kg./cm.$^2$__ | 80 |
| Elongation at break _____percent__ | 550 |
| Micro-rebound elasticity _____do____ | 61 |

Variations can of course be made without departing from the spirit of the invention.

Having thus described our invention, what we desire to secure and claim by Letters Patent is:

1. Process for the preparation of linear, amorphous, unsaturated terpolymers comprising two mono-olefinic monomers and a polycyclic diolefine having an endomethylenic bridge which terpolymer can be vulcanized, wherein the monomers are brought in contact with a binary catalyst system wherein the components are selected in the following classes:
   (a) transition metal compound of the IVa and Va Group of the Periodic System according to Mendeleeff;
   (b) aluminum hydrides, soluble in organic solvents, said aluminum hydride being complexed with a Lewis base or having a secondary aminic radical, as defined below, directly attached to Al, said aluminum hydride having the general formula HAlXY, wherein X and Y, equal or different, are each a hydrogen atom, a halogen atom or a secondary aminic radical of the type—NR$_1$R$_2$ wherein R$_1$ and R$_2$, equal or different, are each alkyls, aryls, alkylaryls, cycloalkyls or part of a nitrogen-containing heterocyclic nucleus.

2. Process according to claim 1, wherein the aluminum hydride is complexed with a Lewis base.

3. Process according to claim 1, wherein the component belonging to the class a is V, or Ti salt.

4. Process according to claim 3, wherein the component belonging to the class b is H$_2$ClAl.O(C$_2$H$_5$)$_2$, AlH$_3$.N(CH$_3$)$_3$, H$_2$Al—N(CH$_3$)$_2$, or HBrAl—N(CH$_3$)$_2$.

5. Process according to claim 1, wherein the aluminum hydride and the transition metal compound are in a molar ratio between 0.25 and 8.

6. Process according to claim 5, wherein the transition metal compound is employed in the amount of 2–50 mmoles per liter of solvent.

7. Process according to claim 1, wherein the polymerization is performed in the presence of a simple or halogenated hydrocarbon solvent, inert under the polymerization conditions.

8. Process according to claim 7, wherein the solvent is n-heptane or toluene.

9. Process according to claim 1, wherein the polymerization is performed at temperatures comprised between −30° and +40° C.

10. Process according to claim 1, wherein the polymerization is performed under pressures up to 10 atm.

11. Process according to claim 1, wherein the monomers which undergo copolymerization are ethylene, propylene and dicyclopentadiene.

12. Process for the preparation of a linear amorphous unsaturated terpolymer of ethylene, propylene and dicyclopentadiene, which terpolymer can be vulcanized, wherein the monomers are brought into contact with a catalyst system comprising (a) a transition metal compound of the IVa and Va group of the Periodic System according to Mendeleeff, and (b) an aluminum hydride soluble in aromatic hydrocarbons, said aluminum hydride being complexed with a Lewis base or having a secondary aminic radical, as defined below, directly attached to Al, said aluminum hydride being one, in which the aluminum atom has the substituents H, X and Y in which X and Y are each hydrogen, halogen or a secondary aminic radical of the type —NR$_1$R$_2$, wherein R$_1$ and R$_2$ are alkyl, aryl, alkaylaryl or cycloalkyl or form a heterocyclic ring including the nitrogen attached to R$_1$ and R$_2$, the molar ratio of the aluminum compound to the transition metal compound being between 0.25 and 8, the polymerization being performed in a hydrocarbon or halohydrocarbon solvent inert under the polymerization conditions, the amount of the transition metal compound being 2–50 mmoles per liter of solvent, the polymerization temperature being −30 to +40° C., at a pressure of up to 10 atmospheres.

13. Process as in claim 12 in which the transition metal compound is $VCl_4$ or $TiCl_4$ and the aluminum compound is $H_2ClAl.O(C_2H_5)_2$, $AlH_3.N(CH_3)_3$, $H_2Al—N(CH_3)_2$, or $HBrAl—N(CH_3)_2$, the molar ratio of the aluminum compound to transition metal compound being between 0.5 and 5, the amount of transition metal compound being 4–20 mmoles per liter of solvent, the solvent being n-heptane or toluene, the temperature being $-10°$ to $+30°$ C. and the pressure being atmospheric.

References Cited
UNITED STATES PATENTS

| | | | |
|---|---|---|---|
| 3,178,400 | 4/1965 | Ragazzini et al. | 260—80.5 |
| 3,211,709 | 10/1965 | Adamek et al. | 260—80.5 |
| 3,260,708 | 7/1966 | Natta et al. | 260—80.5 |

JOSEPH L. SCHOFER, *Primary Examiner.*

W. HOOVER, R. S. BENJAMIN, *Assistant Examiners.*